US011210816B1

(12) United States Patent
An et al.

(10) Patent No.: US 11,210,816 B1
(45) Date of Patent: Dec. 28, 2021

(54) TRANSITIONAL EFFECTS IN REAL-TIME RENDERING APPLICATIONS

(71) Applicants: Xiaobo An, Sunnyvale, CA (US); Peter Dollar, Mountain View, CA (US); Eric J. Mueller, Sunnyvale, CA (US); Brendan K. Duncan, Redmond, WA (US)

(72) Inventors: Xiaobo An, Sunnyvale, CA (US); Peter Dollar, Mountain View, CA (US); Eric J. Mueller, Sunnyvale, CA (US); Brendan K. Duncan, Redmond, WA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 16/549,293

(22) Filed: Aug. 23, 2019

Related U.S. Application Data

(60) Provisional application No. 62/723,630, filed on Aug. 28, 2018.

(51) Int. Cl.
*G06T 11/00* (2006.01)
*G06F 9/451* (2018.01)
*G06F 9/54* (2006.01)

(52) U.S. Cl.
CPC .............. *G06T 11/00* (2013.01); *G06F 9/451* (2018.02); *G06F 9/546* (2013.01); *G06T 2210/52* (2013.01)

(58) Field of Classification Search
None
See application file for complete search history.

(56) References Cited

U.S. PATENT DOCUMENTS

| | | | | | |
|---|---|---|---|---|---|
| 5,797,004 | A | * | 8/1998 | Lindholm | G06F 9/52 718/102 |
| 6,012,926 | A | * | 1/2000 | Hodges | A61M 21/00 434/236 |
| 7,234,139 | B1 | * | 6/2007 | Feinberg | G06F 9/45504 718/1 |
| 7,365,743 | B1 | * | 4/2008 | Chen | G06T 1/20 345/418 |
| 8,185,854 | B1 | * | 5/2012 | Hutton | G06F 30/3312 716/108 |
| 9,992,487 | B1 | * | 6/2018 | Hitchcock | H04N 13/167 |
| 2002/0065848 | A1 | * | 5/2002 | Walker | G06F 40/166 715/205 |

(Continued)

*Primary Examiner* — David H Chu
(74) *Attorney, Agent, or Firm* — Young Basile Hanlon & MacFarlane, P.C.

(57) ABSTRACT

Systems and methods for transitional effects in real-time rendering applications are described. Some implementations may include rendering a computer-generated reality environment in a first state using an application that includes multiple processes associated with respective objects of the computer-generated reality environment; generating a message that indicates a change in the computer-generated reality environment; sending the message to two or more of the multiple processes associated with respective objects of the computer-generated reality environment; responsive to the message, updating configurations of objects of the computer-generated reality environment to change the computer-generated reality environment from the first state to a second state; and rendering the computer-generated reality environment in the second state using the application.

20 Claims, 7 Drawing Sheets

(56) References Cited

U.S. PATENT DOCUMENTS

| | | | |
|---|---|---|---|
| 2004/0172638 A1* | 9/2004 | Larus | G06F 9/54 |
| | | | 719/328 |
| 2010/0111405 A1* | 5/2010 | Lee | G06K 9/38 |
| | | | 382/160 |
| 2011/0055311 A1* | 3/2011 | Kobayashi | H04L 69/40 |
| | | | 709/203 |
| 2012/0004895 A1* | 1/2012 | Zhang | H04L 41/145 |
| | | | 703/13 |
| 2013/0262560 A1* | 10/2013 | Ivashin | G06F 3/1454 |
| | | | 709/203 |
| 2014/0092087 A1* | 4/2014 | Kazama | G06T 11/001 |
| | | | 345/420 |
| 2014/0123150 A1* | 5/2014 | Lindholm | G06F 9/3851 |
| | | | 718/103 |
| 2015/0116310 A1* | 4/2015 | Baudouin | G06F 9/46 |
| | | | 345/419 |
| 2015/0331643 A1* | 11/2015 | Nishikawa | G06T 7/12 |
| | | | 358/1.13 |
| 2016/0155272 A1* | 6/2016 | Polo | G06T 11/00 |
| | | | 345/633 |
| 2016/0378892 A1* | 12/2016 | Ishikawa | G06T 17/005 |
| | | | 703/6 |
| 2017/0124770 A1* | 5/2017 | Vats | G06T 19/003 |
| 2017/0242889 A1* | 8/2017 | Zhao | G06F 16/283 |
| 2017/0346923 A1* | 11/2017 | Gong | H04L 67/1023 |
| 2018/0107269 A1* | 4/2018 | Benzies | G06F 3/012 |
| 2019/0236827 A1* | 8/2019 | Hakura | G06T 15/04 |

* cited by examiner

TRANSITIONAL EFFECTS IN REAL-TIME RENDERING APPLICATIONS

CROSS-REFERENCE TO RELATED APPLICATIONS

This application claims the benefit of U.S. Provisional Application No. 62/723,630, filed on Aug. 28, 2018, entitled "Transitional Effects in Real-Time Rendering Applications," the content of which is incorporated herein by reference in its entirety for all purposes.

TECHNICAL FIELD

This disclosure relates to transitional effects in real-time rendering applications.

BACKGROUND

Real-time rendering applications may be used to present views to a user of a virtual environment including objects. Views of the virtual environment may be presented to a user via a display, such as a head-mounted display. Changing the properties of the virtual environment may involve recoding multiple processes associated with multiple objects that interact in the virtual environment.

SUMMARY

Disclosed herein are implementations of transitional effects in real-time rendering applications.

In a first aspect, the subject matter described in this specification can be embodied in systems that include a head-mounted display. The systems include a processing apparatus configured to render, for presentation on the head-mounted display, a computer-generated reality environment in a first state using an application that includes multiple processes associated with respective objects of the computer-generated reality environment; generate a message that indicates a change in the computer-generated reality environment; send the message to two or more of the multiple processes associated with respective objects of the computer-generated reality environment; responsive to the message, update configurations of objects of the computer-generated reality environment to change the computer-generated reality environment from the first state to a second state; and render, for presentation on the head-mounted display, the computer-generated reality environment in the second state using the application.

In a second aspect, the subject matter described in this specification can be embodied in methods that include rendering a computer-generated reality environment in a first state using an application that includes multiple processes associated with respective objects of the computer-generated reality environment; generating a message that indicates a change in the computer-generated reality environment; sending the message to two or more of the multiple processes associated with respective objects of the computer-generated reality environment; responsive to the message, updating configurations of objects of the computer-generated reality environment to change the computer-generated reality environment from the first state to a second state; and rendering the computer-generated reality environment in the second state using the application.

In a third aspect, the subject matter described in this specification can be embodied in a non-transitory computer-readable storage medium. The non-transitory computer-readable storage medium may include executable instructions that, when executed by a processor, facilitate performance of operations, including rendering a computer-generated reality environment in a first state using an application that includes multiple processes associated with respective objects of the computer-generated reality environment; generating a message that indicates a change in the computer-generated reality environment; sending the message to two or more of the multiple processes associated with respective objects of the computer-generated reality environment; responsive to the message, updating configurations of objects of the computer-generated reality environment to change the computer-generated reality environment from the first state to a second state; and rendering the computer-generated reality environment in the second state using the application.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
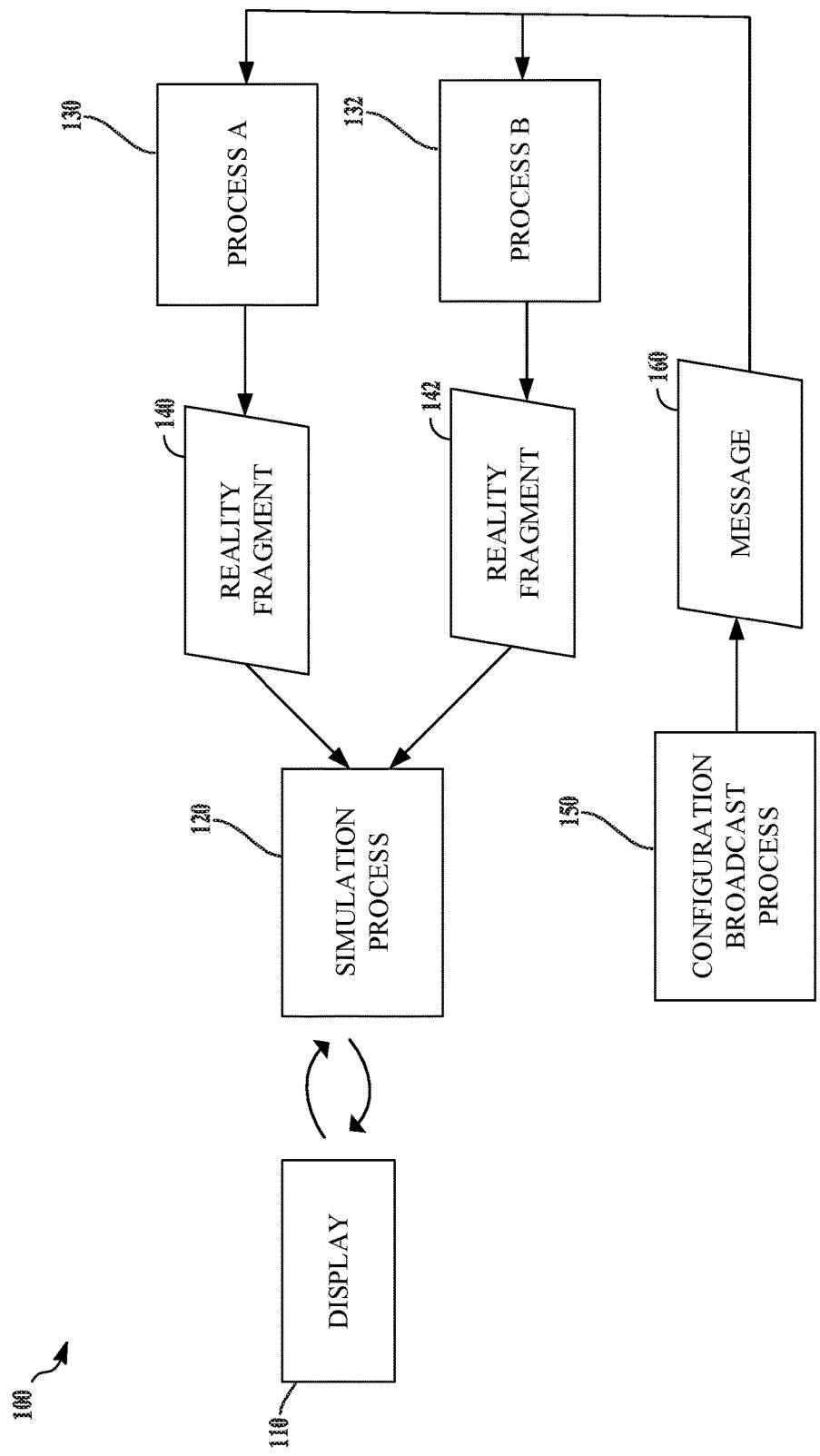
FIG. 1 is a block diagram of an example of a real-time rendering application.

Complex real-time graphics effects like weather consist of many disparate parts, such as, particle systems, lighting, sky shading, clouds, and/or physics simulations. These parts may be complex, with many parameters, and while they may have preset configurations for defining different looks and behaviors, there is no defined consistency or relationships between the different parts. If a user wants to make an entire computer-generated reality environment have a specific look and behavior, such as making a sunny day or a stormy night. It may be a challenging task to change many parts of a computer-generated reality environment to achieve a desired look. Transitioning between these high-level configurations (e.g., a sunny day turning into a stormy night) may be difficult.

Systems and techniques are described herein for addressing this problem of changing a high-level configuration that implicates multiple parts or objects of a computer-generated reality environment. A real-time rendering application (e.g. a computer-generated reality application) may include processes associated with respective objects of a computer-generated reality environment. For example, a process for an object may include a configuration listener (e.g., a configuration listener thread) that receives configuration messages that indicate a change in a high-level configuration. For example, a real-time rendering application may include a configuration broadcaster that sends messages including configuration intent based user input. For example, a configuration intent may include a configuration category and a desired configuration as high-level concepts, such as "Weather: Stormy". For example, a configuration listener may listen for configuration intent messages for specific categories, such as weather, and know how to configure an object associated with the configuration listener in accordance with the configuration intent of the message, such as "stormy". A configuration message may include a transition period (e.g., a duration of time over which a user wants a transition from the current configuration to the desired configuration to occur). For example, a configuration message with a transition period may be defined as "weather: stormy, 5 seconds," which would cause a transition from the current weather configuration to the stormy weather configuration over 5 seconds. In some implementations, configuration intents in a configuration message may be compound, such as "weather: stormy 5 seconds, time: night, 5 seconds," which may cause a transition from the current time and weather to a stormy night over five seconds.

For example, a catalog of categories and configurations may be defined by a real-time rendering application for various configuration listeners to know about and optionally respond to. In some implementations, objects of a computer-generated reality environment may define their own categories and configurations as well, so objects with associated processes (e.g., developed by third parties) may respond to their own defined configuration intents.

The concept of configuration listeners and configuration intent broadcast messages may allow multiple objects to define high-level user friendly abstractions that work across multiple objects without the objects themselves knowing about other objects in a computer-generated reality environment.

The sending and processing of the messages indicating high-level configuration changes for a computer-generated reality environment may offer significant advantages over traditional methods updating a computer-generated reality environment in a real-time rendering application. Traditional updates to a computer-generated reality environment may be significantly more difficult, because, for example, multiple developers familiar with respective objects of the computer-generated reality environment may need to cooperate to update multiple objects of the computer-generated reality environment in a coordinated manner to affect the desired high-level configuration change. For example, the new methods may enable a single user to quickly implement a high-level configuration change across multiple objects of the computer-generated reality environment.

As used in this document, the term "computer-generated reality" refers to a class of applications on a continuum of levels of user immersion that encompasses more immersive virtual reality applications and also less immersive augmented reality applications. In some computer-generated reality applications that are augmented reality applications, a correspondence between a virtual environment and a physical environment surrounding the user may be maintained to enable the overlay of virtual objects on the user's view of the physical environment. In some computer-generated reality applications that are more immersive virtual reality applications, a virtual environment may be untethered from a physical environment (e.g., a user may move through a virtual environment without moving through the physical environment or vice versa).

Physical Environment a. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality a. In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object (s) in a CGR environment may be made in response to representations of physical motions (e.g., vocal commands).

b. A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

c. Examples of CGR include virtual reality and mixed reality.

Virtual Reality a. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment Mixed Reality a. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects).

On a virtuality continuum, a mixed reality environment is anywhere between, but not including, a wholly physical environment at one end and virtual reality environment at the other end.
b. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.
c. Examples of mixed realities include augmented reality and augmented virtuality.
d. Augmented reality
  i. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.
  ii. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof
e. Augmented virtuality
  i. An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware
a. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface, FIG. 1 is a block diagram of an example of a real-time rendering application 100. For example, the real-time rendering application 100 may be a computer-generated reality application. The real-time rendering application 100 includes multiple processes that together implement a CGR environment that a user may view using a display 110 (e.g., the display 240, the head-mounted display 340, or the head-mounted display 410). The real-time rendering application 100 includes a simulation process 120 that coordinates various objects of the CGR environment and generates and presents views of the CGR environment to the user using the display 110. The real-time rendering application 100 includes multiple processes associated with objects of the CGR environment. In this example, the real-time rendering application 100 includes the process A 130, which may be associated with one or more objects (e.g., a sky), and the process B 132, which may be associated with one or more objects (e.g., a body of water). The process A 130 and the process B 132 may maintain the states of their respective objects. The process A 130 and the process B 132 provide updates of the states of their respective objects to the simulation process 120 as a reality fragment 140 and a reality fragment 142. The simulation process 120 may then present the updated objects to the user using the display 110. The real-time rendering application 100 includes a configuration broadcast process 150 that generates and sends a message 160 to the process A 130 and the process B 132. The message 160 indicates a global change in the CGR environment, which may implicate multiple objects of the CGR environment that are maintained by multiple processes. Responsive to receiving the message 160, the process A 130 and the process B 132 update configurations of their objects of the CGR environment to change the CGR environment from the first state to a second state (e.g., changing the virtual weather from a sunny day to a stormy day). The updated configurations may manifest in altered reality fragments reflecting the second state being sent by the process A 130 and the process B 132 to the simulation process 120, which may render, for presentation on the display 110, the CGR environment in the second state.

The simulation process 120 may include one or more threads. The simulation process 120 may coordinate objects of the CGR environment and render views of the CGR environment. For example, the simulation process 120 may implement a physics engine that determines how objects in the CGR environment interact with one another. The simulation process 120 may receive updated state information for objects of the CGR environment from processes corresponding to those objects in the form of reality fragments (e.g., the reality fragment 140 and the reality fragment 142). For example, the reality fragment 140 and the reality fragment 142 may be passed to the simulation process 120 via an inter-process interface. The simulation process 120 may receive view control data (e.g., motion data from a head-mounted display) and may update a view based on the view control data. The simulation process 120 may render the view of the CGR environment as one or more images (e.g., an image for a left eye of the user and an image for a right eye of the user) that may be passed to the display 110 (e.g., the head-mounted display 410) for presentation to the user. For example, the rendered images for the view may be transferred to the display 110 via an interconnect (e.g., the interconnect 270 or the interconnect 370). For example, the rendered images for the view may be transferred to the display 110 via a wireless communications link (e.g., the wireless communications link 425).

The process A 130 may include one or more threads. The process A 130 may maintain and update the state of a virtual object (e.g., a pond, a sky, a tree, rain, or a sun). In some implementations, the process A 130 includes a listener (e.g., a listener thread) that listens for messages from the configuration broadcast process 150. For example, the listener of the process A 130 may register with the configuration broadcast process 150 to be a recipient of configuration messages, such as the message 160. Similarly, the process B 132 may maintain and update the state of another virtual object (e.g., a pond). The process B 132 may include one or more threads. In some implementations, the process B 132 includes a listener (e.g., a listener thread) that listens for messages from the configuration broadcast process 150. For example, the listener of the process B 132 may register with the configuration broadcast process 150 to be a recipient of configuration messages, such as the message 160. For example, the message 160 may be sent using event-based signaling. For example, the message 160 may be sent via an inter-process message queue. In some implementations, the configuration broadcast process 150 sends the message 160 to all processes of the real-time rendering application that are associated with particular objects of the CGR environment.

In some implementations, (not shown in FIG. 1), the configuration broadcast process 150 and the simulation process 120 may be a single combined process, and the message 160 may be generated and sent by the simulation process 120.

Figure 2:
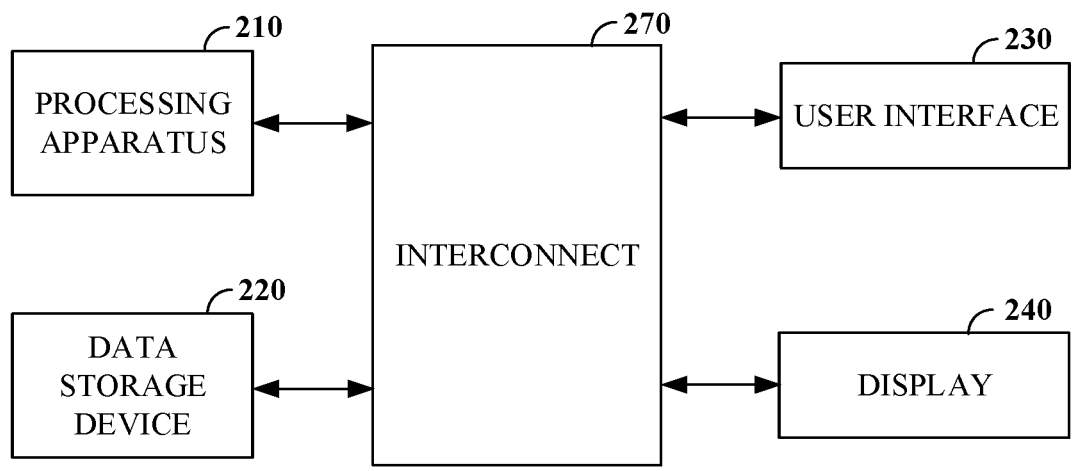
FIG. 2 is a block diagram of an example of a system configured to enable transitional effects in real-time rendering applications.

FIG. 2 is a block diagram of an example of a system 200 configured to enable transitional effects in real-time rendering applications. For example, the system 200 may be a smartphone, a tablet, a laptop, a desktop computer, or an appliance (e.g., a smart television or a smart speaker). The system 200 includes a processing apparatus 210, a data storage device 220, a user interface 230, a display 240, and an interconnect 270 through which the processing apparatus 210 may access the other components. The system 200 may be configured to enable transitional effects implicating multiple objects in a CGR environment of a real-time rendering application (e.g., a computer-generated reality application) that is displayed to a user using the display 240. For example, the processing apparatus 210 may be configured to run the real-time rendering application (e.g., the real-time rendering application 100). For example, the system 200 may be configured to implement the technique 600 of FIG. 6. For example, the system 200 may be configured to implement the technique 700 of FIG. 7. For example, the system 200 may be implemented as part of a display device (e.g., the display 110).

The processing apparatus 210 may be operable to execute instructions that have been stored in a data storage device 220. In some implementations, the processing apparatus 210 is a processor with random access memory for temporarily storing instructions read from the data storage device 220 while the instructions are being executed. The processing apparatus 210 may include single or multiple processors each having single or multiple processing cores. Alternatively, the processing apparatus 210 may include another type of device, or multiple devices, capable of manipulating or processing data. For example, the data storage device 220 may be a non-volatile information storage device such as a hard drive, a solid-state drive, a read-only memory device (ROM), an optical disc, a magnetic disc, or any other suitable type of storage device such as a non-transitory computer readable memory. The data storage device 220 may include another type of device, or multiple devices, capable of storing data for retrieval or processing by the processing apparatus 210. The processing apparatus 210 may access and manipulate data stored in the data storage device 220 via the interconnect 270. For example, the data storage device 220 may store instructions executable by the processing apparatus 210 that upon execution by the processing apparatus 210 cause the processing apparatus 210 to perform operations (e.g., operations that implement the technique 600 of FIG. 6).

The system 200 includes a user interface 230. For example, the user interface 230 may include a touchscreen display. For example, the user interface 230 may include a microphone configured receive speech commands. For example, the user interface 230 may include an image sensor configured to detect hand gesture commands. For example, the user interface 230 may include a keyboard, a mouse, a joystick, and/or another handheld controller. For example, the user interface 230 may enable a user to enter commands (e.g., transitional effect commands) to a real-time rendering application (e.g., the real-time rendering application 100) running on the system 200 and/or to change the configuration of a process associated with an object of a CGR environment of the real-time rendering application.

The display 240 may include a screen, a monitor, a television, or projector to enable the presentation of images (e.g., video frames) to the user. The display 240 may be used to present a view of a CGR environment to the user. For example, the view of the CGR environment may depend on a position and orientation of an avatar of the user in the CGR environment presented by the real-time rendering application.

For example, the interconnect 270 may be a system bus, or a wired or wireless network (e.g., a body area network).

The processing apparatus 210 may be configured to enable transitional effects for a CGR environment of a real-time rendering application (e.g., the real-time rendering application 100 of FIG. 1). For example, the processing apparatus 210 may be configured to render, for presentation on the display 240, a CGR environment in a first state using an application that includes multiple processes associated with respective objects of the CGR environment. For example, the processing apparatus 210 may be configured to generate a message that indicates a change in the CGR environment, and send the message to two or more of the multiple processes associated with respective objects of the CGR environment. For example, the processing apparatus 210 may be configured to, responsive to the message, update configurations of objects of the CGR environment to change the CGR environment from the first state to a second state, and render, for presentation on the display 240, the CGR environment in the second state using the application. For example, the application may include a broadcast process that sends the message. In some implementations, the broadcast process may be used to send the message to all processes of the application that are associated with respective objects of the CGR environment. For example, the two or more of the multiple processes associated with respective objects of the CGR environment may include listening threads that receive the message, and the processing apparatus 210 may be configured to register the listening threads with the broadcast process. In some implementations, the application includes a simulation process (e.g., the simulation process 120) that coordinates objects of the CGR environment and renders views of the CGR environment, and the message is sent by the simulation process. For example, the message may include an indication of a transition period. In some implementations, the processing apparatus 210 is configured to, responsive to the message, update the configurations of objects of the CGR environment in a sequence of intermediate steps to gradually transition the CGR environment from the first state to the second state via a sequence of intermediate states over the transition period, and render, for presentation on the display 240, the CGR environment in the sequence of intermediate states using the application. For example, the message may include a configuration category and corresponding configuration value. For example, the message may include an indication of weather (e.g., sunny, rainstorm, or blizzard) for the CGR environment. For example, the message may include an indication of time of day for the CGR environment. For example, the message may include an indication of a room type for the CGR environment. For example, the message may be sent using event-based signaling. For example, the message may be sent via an inter-process message queue. For example, the message may be generated based on user input received via a user interface 230. For example, the application may be a computer-generated reality application.

Figure 3:
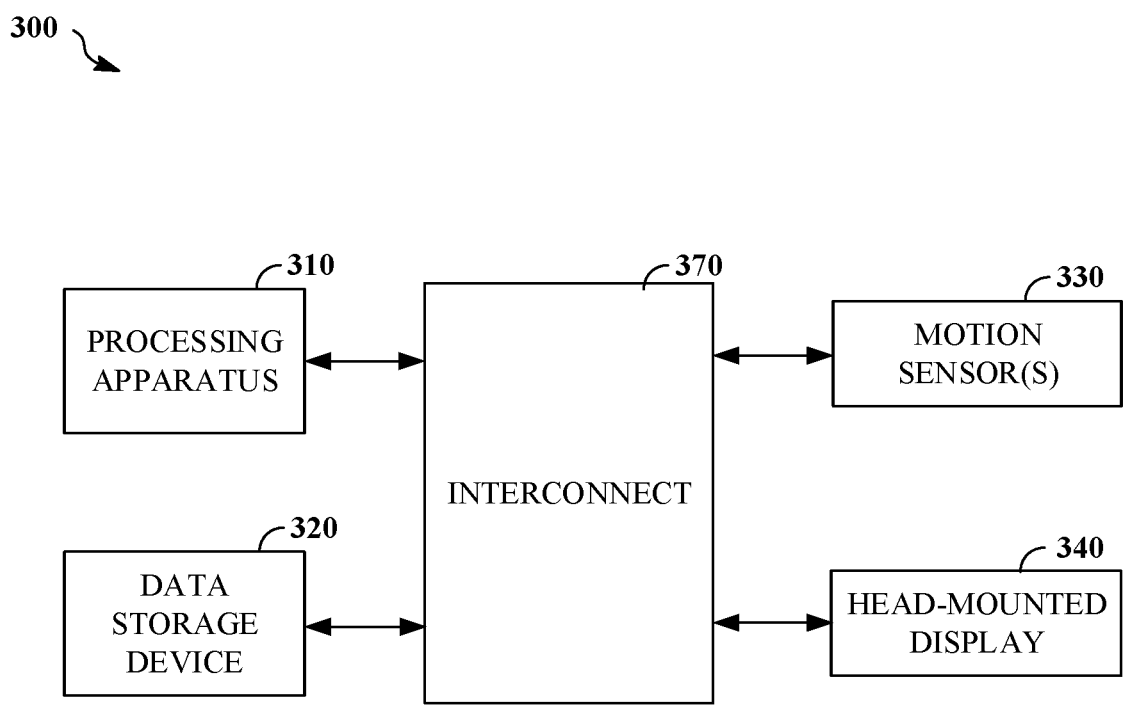
FIG. 3 is a block diagram of an example of a system configured to enable transitional effects in real-time rendering applications.

FIG. 3 is a block diagram of an example of a system 300 configured to enable transitional effects in real-time rendering applications. The system 300 includes a processing apparatus 310, a data storage device 320, one or more motion sensors 330, a head-mounted display 340, and an interconnect 370 through which the processing apparatus 310 may access the other components. The system 300 may be configured to enable transitional effects implicating multiple objects in a CGR environment of a real-time rendering application (e.g., a computer-generated reality application) that is displayed to a user using the head-mounted display 340. For example, the processing apparatus 310 may be configured to run the real-time rendering application (e.g., the real-time rendering application 100). For example, the system 300 may be configured to implement the technique 600 of FIG. 6. For example, the system 300 may be configured to implement the technique 700 of FIG. 7. For example, the system 300 may be implemented as part of a display device (e.g., the display 110).

The processing apparatus 310 may be operable to execute instructions that have been stored in a data storage device 320. In some implementations, the processing apparatus 310 is a processor with random access memory for temporarily storing instructions read from the data storage device 320 while the instructions are being executed. The processing apparatus 310 may include single or multiple processors each having single or multiple processing cores. Alternatively, the processing apparatus 310 may include another type of device, or multiple devices, capable of manipulating or processing data. For example, the data storage device 320 may be a non-volatile information storage device such as a hard drive, a solid-state drive, a read-only memory device (ROM), an optical disc, a magnetic disc, or any other suitable type of storage device such as a non-transitory computer readable memory. The data storage device 320 may include another type of device, or multiple devices, capable of storing data for retrieval or processing by the processing apparatus 310. The processing apparatus 310 may access and manipulate data stored in the data storage device 320 via the interconnect 370. For example, the data storage device 320 may store instructions executable by the processing apparatus 310 that upon execution by the processing apparatus 310 cause the processing apparatus 310 to perform operations (e.g., operations that implement the technique 600 of FIG. 6). In some implementations, the processing apparatus 310 and the data storage device 320 are attached to the head-mounted display 340.

The one or more motions sensors 330 may be configured to detect motion of the head-mounted display 340. For example, the one or more motions sensors 330 may include one or more accelerometers, gyroscopes, and/or magnetometers. In some implementations, the one or more motions sensors 330 are attached to the head-mounted display 340. In some implementations, an orientation and/or a position of the head-mounted display 340 in a real space may be determined based on sensor data from the one or more motions sensors 330. For example, changes in the orientation and/or a position of the head-mounted display 340 may be used as a control interface for a user to change a view of a CGR environment of a computer-generated reality application that is presented using the head-mounted display 340.

The head-mounted display 340 includes a screen, a lens, or another type of optical assembly configured to direct light to the eyes of a user wearing the head-mounted display 340 to enable the presentation of images (e.g., video frames) to the user. The head-mounted display may be held in place on a face of the user by a fastening article (e.g., a headband or a frame). In some implementations, a screen of the head-mounted display 340 is positioned directly in front of eyes of the user. The screen may be opaque and may obscure the user's view of a surrounding environment. Such a configuration may be used, for example, to provide immersive virtual reality experiences. In some implementations, the head-mounted display 340 includes an optical assembly (e.g., a lens and/or a mirror) that is positioned directly in front of eyes of the user and configured to direct light from a screen or projector of the head-mounted display 340 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from an environment in front of the user pass through to reach eyes of the user and allow the user to see in front of him while having objects of a CGR environment depicted in an image presented by the head-mounted display 340 overlaid on a view of the physical environment in front of the user. In some implementations, a transparency of the optical assembly (e.g., a lens) may be adjusted to suit an application (e.g., a virtual reality application or an augmented reality application).

For example, the interconnect 370 may be a system bus, or a wired or wireless network (e.g., a body area network).

The processing apparatus 310 may be configured to enable transitional effects for a CGR environment of a real-time rendering application (e.g., the real-time rendering application 100 of FIG. 1). For example, the processing apparatus 310 may be configured to render, for presentation on the head-mounted display 340, a CGR environment in a first state using an application that includes multiple processes associated with respective objects of the CGR environment. For example, the processing apparatus 310 may be configured to generate a message that indicates a change in the CGR environment, and send the message to two or more of the multiple processes associated with respective objects of the CGR environment. For example, the processing apparatus 310 may be configured to, responsive to the message, update configurations of objects of the CGR environment to change the CGR environment from the first state to a second state, and render, for presentation on the head-mounted display 340, the CGR environment in the second state using the application. For example, the application may include a broadcast process that sends the message. In some implementations, the broadcast process may be used to send the message to all processes of the application that are associated with respective objects of the CGR environment. For example, the two or more of the multiple processes associated with respective objects of the CGR environment may include listening threads that receive the message, and the processing apparatus 310 may be configured to register the listening threads with the broadcast process. In some implementations, the application includes a simulation process (e.g., the simulation process 120) that coordinates objects of the CGR environment and renders views of the CGR environment, and the message is sent by the simulation process. For example, the message may include an indication of a transition period. In some implementations, the processing apparatus 310 is configured to, responsive to the message, update the configurations of objects of the CGR environment in a sequence of intermediate steps to gradually transition the CGR environment from the first state to the second state via a sequence of intermediate states over the transition period, and render, for presentation on the head-mounted display 340, the CGR environment in the sequence of intermediate states using the application. For example, the message may include a configuration category and corresponding configuration value. For example, the message may include an indication of weather (e.g., sunny, rainstorm, or blizzard) for the CGR environment. For example, the message may include an indication of time of day for the CGR environment. For example, the message may include an indication of a room type for the CGR environment. For example, the message may be sent using event-based signaling. For example, the message may be sent via an inter-process message queue. For example, the message may be generated based on user input received via a user interface. For example, the application may be a computer-generated reality application.

Figure 4:
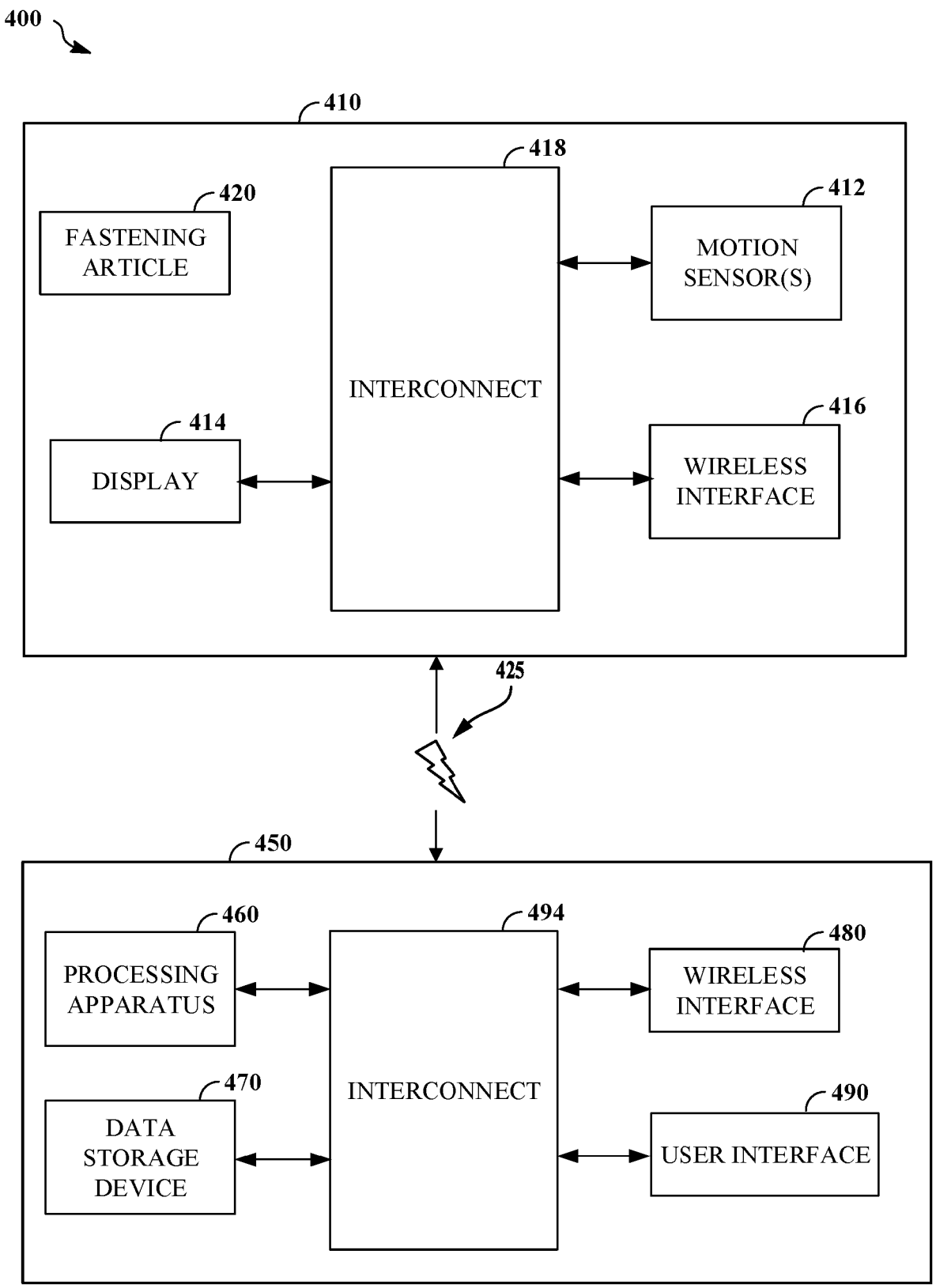
FIG. 4 is a block diagram of an example of a system configured to enable transitional effects in real-time rendering applications.

FIG. 4 is a block diagram of an example of a system 400 configured to enable transitional effects in real-time rendering applications. The system 400 includes a head-mounted display 410 and a computing device 450 that communicate via wireless communications link 425. The head-mounted display 410 includes one or more motions sensors 412, a display 414, a wireless communications interface 416, an interconnect 418 through which components of the head-mounted display may exchange information (e.g., under the control of microcontroller or other processing apparatus in the head-mounted display 410 that is not shown in FIG. 4), and a fastening article 420 configured to hold the head-mounted display 410 in place on a head of a user that is wearing the head-mounted display 410. The computing device 450 includes a processing apparatus 460, a data storage device 470, a wireless communications interface 480, a user interface 490, and an interconnect 494 through which the processing apparatus 460 may access the other components of the computing device 450. The computing device 450 may be positioned near a user wearing the head-mounted display 410 and may perform computational tasks to control the head-mounted display 410. For example, the computing device 450 may be a smartphone, a tablet, a laptop, a desktop computer, or an appliance (e.g., a smart television or a smart speaker) on a table located in a room with the user, or the computing device 450 may be another wearable device worn at a different body part of the user (e.g. integrated with a vest worn on a chest). The system 400 may be configured to enable transitional effects implicating multiple objects in a CGR environment of a real-time rendering application (e.g., a computer-generated reality application) that is displayed to a user using the head-mounted display 410. For example, the processing apparatus 460 may be configured to run a real-time rendering application (e.g., the real-time rendering application 100). For example, the system 400 may be configured to implement the technique 600 of FIG. 6. For example, the system 400 may be configured to implement the technique 700 of FIG. 7.

The head-mounted display 410 includes one or more motion sensors 412. The one or more motions sensors 412 may be configured to detect motion of the head-mounted display 410. For example, the one or more motions sensors 412 may include one or more accelerometers, gyroscopes, and/or magnetometers. The one or more motions sensors 412 may be attached to the head-mounted display 410. In some implementations, an orientation and/or a position of the head-mounted display 410 in a real space may be determined based on sensor data from the one or more motions sensors 412. For example, changes in the orientation and/or a position of the head-mounted display 410 may be used as a control interface for a user to change a view of a CGR environment of a computer-generated reality application that is presented using the head-mounted display 410.

The head-mounted display 410 includes a display 414. The display 414 may be configured to present images, converting digital images into light projected from the display 414. The display 414 may project light using an array of pixels that project light in a visible spectrum. The display 414 may include a screen, a lens, or another type of optical assembly configured to direct light to the eyes of a user wearing the head-mounted display 410 to enable the presentation of images (e.g., video frames) to the user. For example, the display 414 may include a screen, such as a liquid crystal display (LCD), a light emitting diode (LED) display (e.g., an OLED display), or other suitable screen. For example, the display 414 may include a projector. In some implementations, a screen of the display 414 is positioned directly in front of eyes of the user. The screen may be opaque and may obscure the user's view of a surrounding environment. Such a configuration may be used, for example, to provide immersive virtual reality experiences. In some implementations, the display 414 includes an optical assembly (e.g., a lens and/or a mirror) that is positioned directly in front of eyes of the user and configured to direct light from a screen or projector of the display 414 to the eyes of the user. The optical assembly may also direct light from an environment around the user to eyes of the user. For example, the optical assembly may include a partially reflective polarizing film applied to an inner surface of a transparent visor. The optical assembly may function as an optical combiner. For example, a lens of the optical assembly may also let light from a physical environment in front of the user pass through to reach eyes of the user and allow the user to see in front of him while having objects of a CGR environment depicted in an image presented by the display 414 overlaid on a view of the physical environment in front of the user. In some implementations, a transparency of the optical assembly (e.g., a lens) may be adjusted to suit a computer-generated reality application (e.g., a virtual reality application or an augmented reality application).

The head-mounted display 410 includes a wireless communications interface 416. The wireless communications interface 416 facilitates communication with other devices, including the computing device 450. For example, wireless communications interface 416 may facilitate communication via a Wi-Fi network, a Bluetooth link, or a ZigBee link. In some implementations, the wireless communications interface 416 may be used to receive, from the computing device 450, data and/or instructions invoking presentation using the display 414 of a view of a CGR environment. In some implementations, the wireless communications interface 416 may be used to transmit sensor data from the one or more motion sensors 412 to the computing device 450.

For example, the interconnect 418 may be a system bus, or a wired or wireless network (e.g., a body area network). The head-mounted display 410 includes a fastening article 420. The fastening article 420 may be configured to hold the head-mounted display 410 in place on a head of a user when the user is wearing the head-mounted display 410. For example, the fastening article 420 may include a headband.

For example, the fastening article 420 may include a frame with arms that rest on ears of the user and hold a lens or a screen of the display 414 in front of an eye of the user.

The computing device 450 includes a processing apparatus 460. The processing apparatus 460 may be operable to execute instructions that have been stored in a data storage device 470. In some implementations, the processing apparatus 460 is a processor with random access memory for temporarily storing instructions read from the data storage device 470 while the instructions are being executed. The processing apparatus 460 may include single or multiple processors each having single or multiple processing cores. Alternatively, the processing apparatus 460 may include another type of device, or multiple devices, capable of manipulating or processing data. For example, the data storage device 470 may be a non-volatile information storage device such as a hard drive, a solid-state drive, a read-only memory device (ROM), an optical disc, a magnetic disc, or any other suitable type of storage device such as a non-transitory computer readable memory. The data storage device 470 may include another type of device, or multiple devices, capable of storing data for retrieval or processing by the processing apparatus 460. The processing apparatus 460 may access and manipulate data stored in the data storage device 470 via interconnect 494. For example, the data storage device 470 may store instructions executable by the processing apparatus 460 that upon execution by the processing apparatus 460 cause the processing apparatus 460 to perform operations (e.g., operations that implement the technique 600 of FIG. 6).

The computing device 450 includes a wireless communications interface 480. The wireless communications interface 480 facilitates communication with other devices, including the head-mounted display 410. For example, wireless communications interface 480 may facilitate communication via a Wi-Fi network, a Bluetooth link, or a ZigBee link. The wireless communications interface 480 may be used to establish the wireless communications link 425 with the head-mounted display 410. In some implementations, the wireless communications interface 480 may be used to receive sensor data (e.g., motion sensor data) from the head-mounted display 410. In some implementations, the wireless communications interface 480 may be used to transmit, to the head-mounted display 410, data and/or instructions invoking presentation using the display 414 of a view of a CGR environment.

The computing device 450 includes a user interface 490. For example, the user interface 490 may include a touchscreen display. For example, the user interface 490 may include a microphone configured receive speech commands. For example, the user interface 490 may include an image sensor configured to detect hand gesture commands. For example, the user interface 490 may include a keyboard, a mouse, a joystick, and/or another handheld controller. For example, the user interface 490 may enable a user (e.g., the user wearing the head-mounted display 410) to enter commands (e.g., transitional effect commands) to a real-time rendering application (e.g., the real-time rendering application 100) running on the computing device 450 and/or to change the configuration of a process associated with an object of a CGR environment of the real-time rendering application.

For example, the interconnect 494 may be a system bus, or a wired or wireless network (e.g., a body area network).

The processing apparatus 460 may be configured to enable transitional effects for a CGR environment of a real-time rendering application (e.g., the real-time rendering application 100 of FIG. 1). For example, the processing apparatus 460 may be configured to render, for presentation on the head-mounted display 410, a CGR environment in a first state using an application that includes multiple processes associated with respective objects of the CGR environment. For example, the processing apparatus 460 may be configured to generate a message that indicates a change in the CGR environment, and send the message to two or more of the multiple processes associated with respective objects of the CGR environment. For example, the processing apparatus 460 may be configured to, responsive to the message, update configurations of objects of the CGR environment to change the CGR environment from the first state to a second state, and render, for presentation on the head-mounted display 410, the CGR environment in the second state using the application. For example, the application may include a broadcast process that sends the message. In some implementations, the broadcast process may be used to send the message to all processes of the application that are associated with respective objects of the CGR environment. For example, the two or more of the multiple processes associated with respective objects of the CGR environment may include listening threads that receive the message, and the processing apparatus 460 may be configured to register the listening threads with the broadcast process. In some implementations, the application includes a simulation process (e.g., the simulation process 120) that coordinates objects of the CGR environment and renders views of the CGR environment, and the message is sent by the simulation process. For example, the message may include an indication of a transition period. In some implementations, the processing apparatus 460 is configured to, responsive to the message, update the configurations of objects of the CGR environment in a sequence of intermediate steps to gradually transition the CGR environment from the first state to the second state via a sequence of intermediate states over the transition period, and render, for presentation on the head-mounted display 410, the CGR environment in the sequence of intermediate states using the application. For example, the message may include a configuration category and corresponding configuration value. For example, the message may include an indication of weather (e.g., sunny, rainstorm, or blizzard) for the CGR environment. For example, the message may include an indication of time of day for the CGR environment. For example, the message may include an indication of a room type for the CGR environment. For example, the message may be sent using event-based signaling. For example, the message may be sent via an inter-process message queue. For example, the message may be generated based on user input received via the user interface 490 (e.g., based on a voice recognition command). For example, the application may be a computer-generated reality application.

In some implementations, (not shown in FIG. 4), processing for a real-time rendering application (e.g., the real-time rendering application 100) may be distributed between a processing apparatus in the head-mounted display 410 and the processing apparatus 460. For example, a simulation process (e.g., the simulation process 120) may be run on a processing apparatus of the head-mounted display 410 to reduce latency for updates to the view of the CGR environment, while one or more processes (e.g., the process A 130 and the process B 132) associated with objects in the CGR environment may be run on the processing apparatus 460 to update the states of the objects. In some implementations, reality fragments (e.g., the reality fragment 140 and the reality fragment 142) may be transmitted via the wireless communications link 425 between the head-mounted display 410 and the computing device 450. Thus, the processing apparatus of the head-mounted display 410 and the processing apparatus 460 may operate as single processing apparatus distributed between the head-mounted display 410 and the computing device 450 that runs the real-time rendering application and implements techniques described herein (e.g., the technique 600 of FIG. 6).

Figure 5:
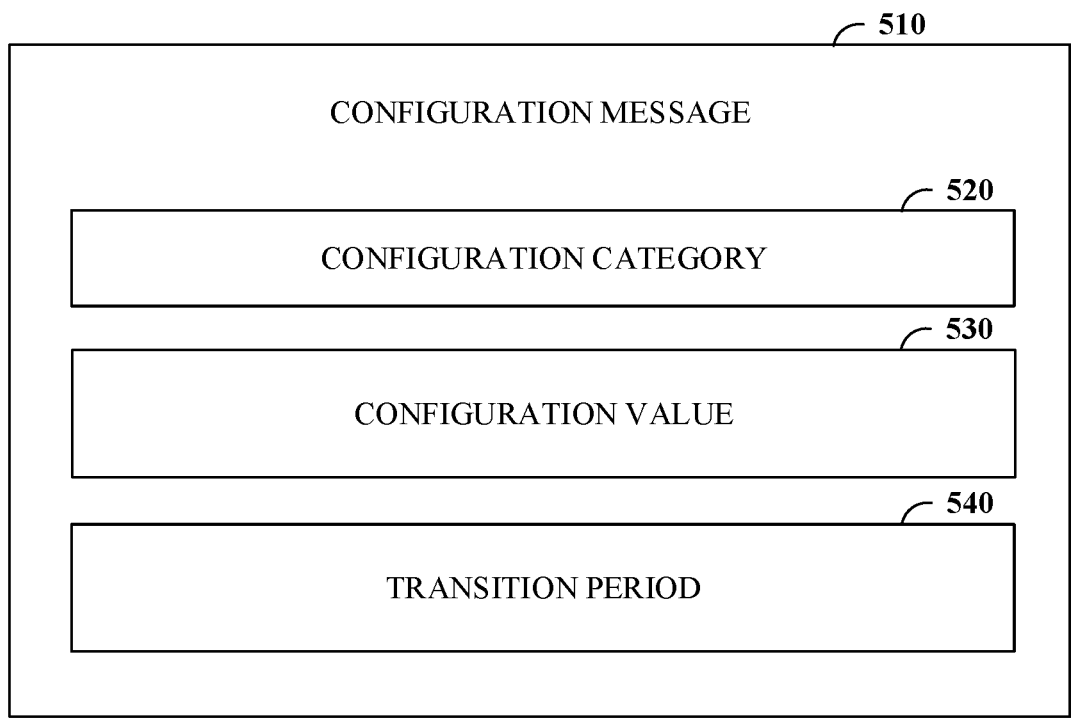
FIG. 5 is a memory map of an example of a configuration message.

FIG. 5 is a memory map of an example of a configuration message 510. The configuration message 510 may be used to facilitate a transitional effect in a CGR environment that is presented by a real-time rendering application (e.g., the real-time rendering application 100). The configuration message 510 includes a configuration category 520, a corresponding configuration value 530, and a transition period 540. In some implementations, the configuration message 510 is in a JavaScript Object Notation (JSON) format.

For example, the configuration category 520 may be stored as a string of text (e.g., "weather", "time-of-day", or "room type") or as an integer with values mapped to known categories of high-level configurations.

For example, the configuration value 530 may be stored as a string of text (e.g., "sunny", "rainstorm", "blizzard", "dawn", "noon", "dusk", "night", "café", "restaurant", "office", "auditorium", or "classroom") or as an integer with values mapped to known values of high-level configurations.

For example, the transition period 540 may be stored as an integer reflecting the duration of the transition period in units, such as milliseconds, seconds, or minutes.

In some implementations, the configuration message 510 is stored in memory (e.g., in the data storage device 220, the data storage device 320, or the data storage device 470). For example, the configuration message 510 may be stored in an inter-process message queue to send the configuration message 510 from a configuration broadcast process (e.g., the configuration broadcast process 150) that writes the configuration message 510 to two or more processes (e.g., the process A 130 and the process B 132) associated with respective objects of the CGR environment that read (e.g., using listening threads) the configuration message 510. In some implementations, (although not explicitly shown in FIG. 5), the configuration message 510 may include a process identifier, address, or other identifying information for directing the configuration message 510 to a particular process or group of processes with access to the inter-process message queue. In some implementations, (although not explicitly shown in FIG. 5), the configuration message 510 may include a timestamp indicating when the configuration message was issued or when the configuration message is intended to be applied to change the configurations of objects of the CGR environment.

Figure 6:
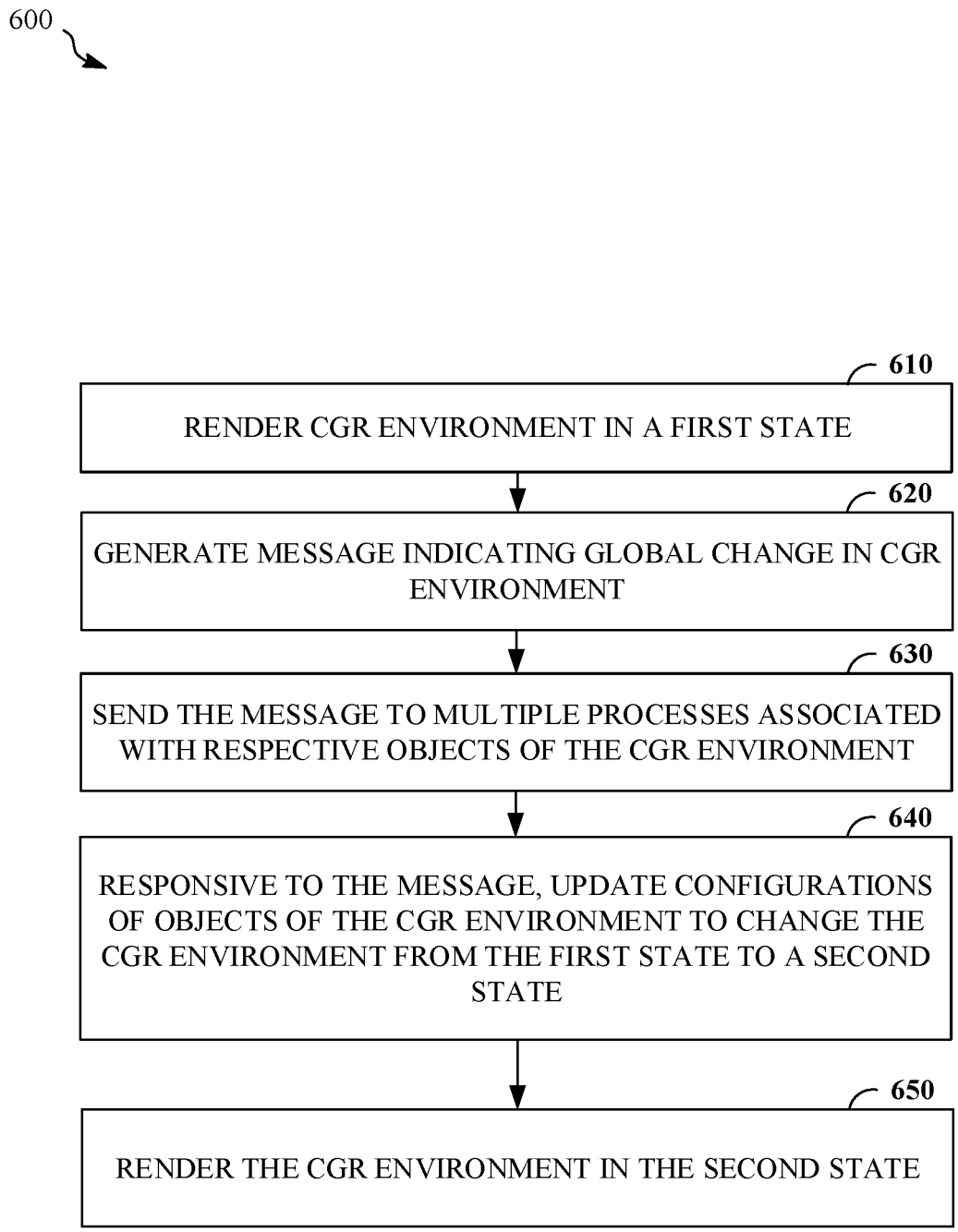
FIG. 6 is a flowchart of an example of a technique for enabling transitional effects in real-time rendering applications.

FIG. 6 is a flowchart of an example of a technique 600 for enabling transitional effects in real-time rendering applications. The technique 600 includes rendering 610 a CGR environment in a first state using an application that includes multiple processes associated with respective objects of the CGR environment; generating 620 a message that indicates a change in the CGR environment; sending 630 the message to two or more of the multiple processes associated with respective objects of the CGR environment; responsive to the message, updating 640 configurations of objects of the CGR environment to change the CGR environment from the first state to a second state; and rendering 650 the CGR environment in the second state using the application. For example, the technique 600 may be implemented by the system 200 of FIG. 2. For example, the technique 600 may be implemented by the system 300 of FIG. 3. For example, the technique 600 may be implemented by the system 400 of FIG. 4.

The technique 600 includes rendering 610 a CGR environment in a first state using an application (e.g., the real-time rendering application 100) that includes multiple processes associated with respective objects of the CGR environment. For example, the application may be a computer-generated reality application. In some implementations, the CGR environment may be rendered 610 for presentation on a head-mounted display (e.g., the head-mounted display 340 or the head-mounted display 410). For example, rendering 610 the CGR environment may include generating one or more images (e.g., for a single screen, or left eye and right eye images) that may be displayed (e.g., using a screen, a head-mounted display, or another type of display) to provide a view of the CGR environment to one or more users. The one or more images may include computer generated images of objects of the CGR environment that are visible in the view. For example, the first state may include weather (e.g., sunny, windy, and/or cloudy) for the CGR environment. For example, the first state may include a time of day for the CGR environment. For example, the first state may include a room type (e.g., a café, a restaurant, an office, or a classroom) for the CGR environment, which may be set indoors. The multiple processes (e.g., the process A 130 and the process B 132) associated with respective objects of the CGR environment may operate to maintain an evolving state of their respective objects. For example, a process for clouds or sky may cause the clouds to move across the sky gradually within the CGR environment.

The technique 600 includes generating 620 a message (e.g., the message 160) that indicates a change in the CGR environment. The change may be global in the sense that it implicates a change in the configuration of multiple objects that are associated with different processes of the real-time rendering application (e.g., a computer-generated reality application). For example, the message may include an indication of weather for the CGR environment (e.g., change the weather to rain storm or blizzard) For example, the indication of the weather may implicate multiple objects of the CGR environment, including both an object for the sky of the CGR environment and object for the ground of the CGR environment. For example, the message may include an indication of time of day for the CGR environment. (e.g., change the time of day to dusk, midnight, or daybreak). For example, the message may include an indication of a room type (e.g., change the room type to a café, a classroom, or an auditorium) for the CGR environment. In some implementations, the message includes an indication of a transition period, over which the state of the CGR environment should change from the first state to a second state indicated by the message. For example, the message includes a configuration category (e.g., weather, time of day, or room type) and a corresponding configuration value. For example, the message may include the configuration message 510 of FIG. 5. In some implementations, the message is generated 620 based on user input received via a user interface (e.g., the user interface 230 or the user interface 490). For example, a user may issue a command to change a configuration of their environment (e.g., changing a simulated location or the weather at a current location).

The technique 600 includes sending 630 the message to two or more of the multiple processes associated with respective objects of the CGR environment. For example, the application includes a broadcast process (e.g., the configuration broadcast process 150) that sends 630 the message. In some implementations, the broadcast process may be used to send 630 the message to all processes of the application that are associated with respective objects of the CGR environment. For example, the two or more of the multiple processes associated with respective objects of the CGR environment include listening threads that receive the message. In some implementations, the listening threads register with the broadcast process to receive configuration messages. For example, the message may be sent 630 using event-based signaling. For example, the message may be sent 630 via an inter-process message queue. For example, the application may include a simulation process (e.g., the simulation process 120) that coordinates objects of the CGR environment and renders views of the CGR environment. In some implementations, the message is sent 630 by the simulation process.

The technique 600 includes, responsive to the message, updating 640 configurations of objects of the CGR environment to change the CGR environment from the first state to a second state. For example, the first state and the second state may differ by a change in weather within the CGR environment that is indicated by the message. For example, a global configuration of weather that is used by multiple processes associated with different objects of the CGR environment may be set to a sunny, clear day value initially, which causes the objects to present properties consistent with this global weather configuration that are characteristic of the first state of the CGR environment. The message may be generated 620 and sent 630 that indicates the value of this global configuration of weather will be set to new value of rainstorm. In response to the message, configurations of the objects may be updated 640 to change the CGR environment from the first state to the second state characterized by a rainstorm. For example, a sky object may change its configuration in order to present a cloudy, overcast sky rather than a sunny, clear sky. In some implementations, an object that is inactive can have its configuration updated 640 to active configuration that causes the object to manifest in the CGR environment. For example, a rain object that was previously inactive and not presenting in views of the CGR environment may be changed to an active configuration that causes falling rain to appear in view of the CGR environment. In some implementations, an object that is active can have its configuration updated 640 to an inactive configuration that causes the object to stop appearing in views of the CGR environment. For example, responsive to a message indicating a change from a first state with rainstorm weather to a second state with sunny weather, a rain object may have its configuration changed to an inactive configuration. For example, the first state and the second state may differ by a change in room type within the CGR environment that is indicated by the message. For example, in the first state a first set of objects that are furniture and walls of a first room type (e.g., café) may be in an active configuration that causes them to appear in views of the CGR environment, and a second set of objects that are furniture and walls of a second room type (e.g., classroom) may be in an inactive configuration. For example, in the second state the first set of objects that are furniture and walls of a first room type (e.g., café) may be updated 640 to an inactive configuration that causes them not to appear in views of the CGR environment, and a second set of objects that are furniture and walls of a second room type (e.g., classroom) may be updated 640 to an active configuration that causes them to appear in views of the CGR environment.

For example, the change of the CGR environment from the first state to the second state may be implemented abruptly or gradually. For example, an abrupt change in room type may have the effect of seeming to instantly teleport a user to a new virtual location. In some implementations, the message indicates a transition period between the first state and the second state, and the configurations of objects of the CGR environment are updated 640 gradually in intermediate steps over the transition period until the second state is reached. For example, the technique 700 of FIG. 7 may be implemented to gradually transition from the first state to the second state over a transition period in response to the message. For example, a gradual change in the weather may cause a smooth realistic transition of the weather within the CGR environment.

The technique 600 includes rendering 650 the CGR environment in the second state using the application. In some implementations, the CGR environment may be rendered 650 for presentation on a head-mounted display (e.g., the head-mounted display 340 or the head-mounted display 410). For example, rendering 650 the CGR environment may include generating one or more images (e.g., for a single screen, or left eye and right eye images) that may be displayed (e.g., using a screen, a head-mounted display, or another type of display) to provide a view of the CGR environment to one or more users. The one or more images may include computer generated images of objects of the CGR environment that are visible in the view. For example, the second state may include weather (e.g., sunny, windy, and/or cloudy) for the CGR environment. For example, the second state may include a time of day for the CGR environment. For example, the second state may include a time of day for the CGR environment. For example, the second state may include a room type (e.g., a café, a restaurant, an office, or a classroom) for the CGR environment, which may be set indoors. The multiple processes (e.g., the process A 130 and the process B 132) associated with respective objects of the CGR environment may operate to maintain an evolving state of their respective objects.

Figure 7:
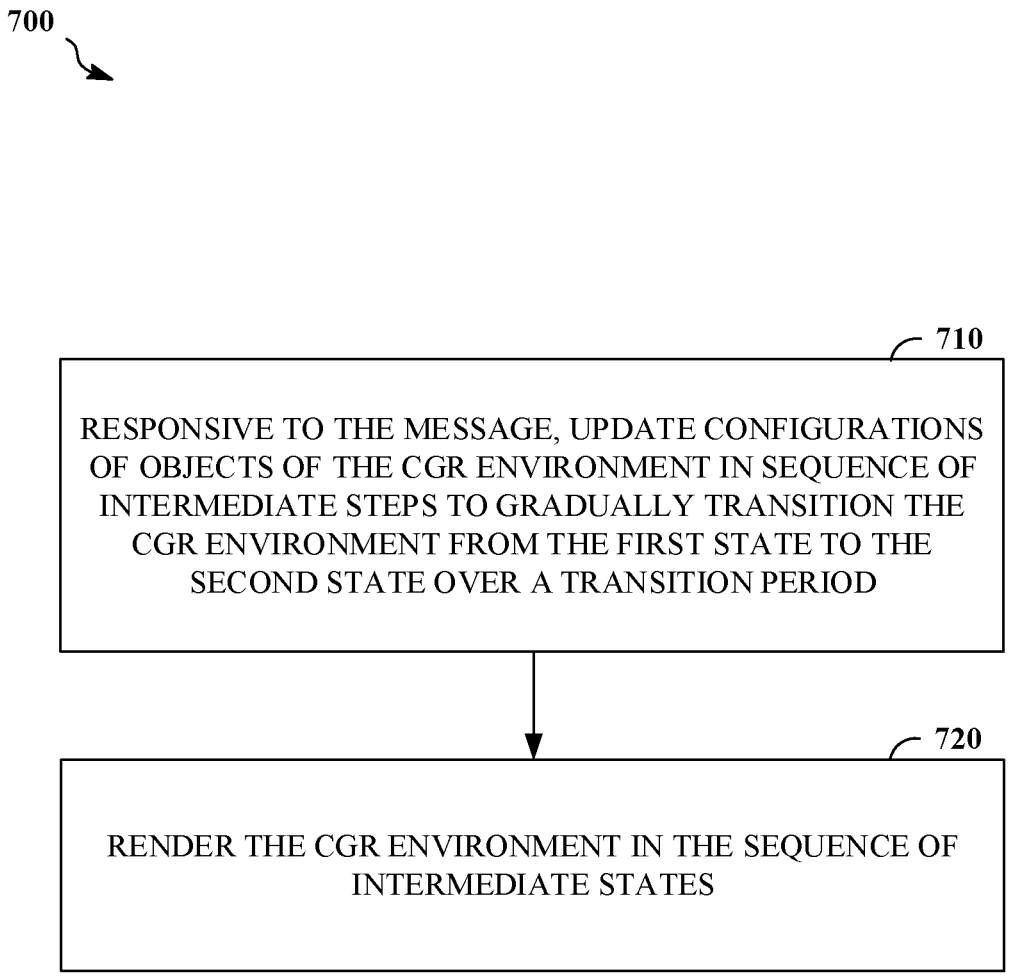
FIG. 7 is a flowchart of an example of a technique for updating configurations of objects of a computer-generated reality environment to change the computer-generated reality environment over a transition period.

FIG. 7 is a flowchart of an example of a technique 700 for updating configurations of objects of a CGR environment to change the CGR environment over a transition period. The technique 700 includes updating 710 the configurations of objects of the CGR environment in a sequence of intermediate steps to gradually transition the CGR environment from a first state to a second state via a sequence of intermediate states over the transition period; and rendering 720 the CGR environment in the sequence of intermediate states using an application. For example, the technique 700 may be implemented by the system 200 of FIG. 2. For example, the technique 700 may be implemented by the system 300 of FIG. 3. For example, the technique 700 may be implemented by the system 400 of FIG. 4.

The technique 700 includes responsive to a message, updating 710 the configurations of objects of the CGR environment in a sequence of intermediate steps to gradually transition the CGR environment from the first state to the second state via a sequence of intermediate states over the transition period. The message includes an indication of a configuration change and the transition period. For example, the message may include the configuration message 510 of FIG. 5. For example, in response to a message indicating a change of a global weather configuration to a rainstorm, a rain object may have its configuration updated 710 in a sequence of intermediate steps where the frequency and/or concentration of rain drops is gradually increased over a transition period (e.g., one minute or two minutes). For example, the configuration of a sky object may be updated 710 in a sequence of intermediate steps where the darkness and/or color of the sky is gradually changed over a transition period.

The technique 700 includes rendering 720 the CGR environment in the sequence of intermediate states using the application (e.g., the real-time rendering application 100). In some implementations, the CGR environment may be rendered 720 for presentation on a head-mounted display (e.g., the head-mounted display 340 or the head-mounted display 410). For example, rendering 720 the CGR environment may include generating one or more images (e.g., for a single screen, or left eye and right eye images) that may be displayed (e.g., using a screen, a head-mounted display, or another type of display) to provide a sequence of views of the CGR environment to one or more users. The one or more images may include computer generated images of objects of the CGR environment that are visible in the view. For example, the second state may include weather (e.g., sunny, windy, and/or cloudy) for the CGR environment. For example, the intermediate states may include respective times of day for the CGR environment.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time.

As described above, one aspect of the present technology is the gathering and use of data available from various sources to improve the delivery to users of content (e.g., virtual objects in an augmented reality environment) or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to exercise control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of virtual object delivery services, the present technology can be configured to allow users to select to "opt in" or "opt out" of participation in the collection of personal information data during registration for services or anytime thereafter. In another example, users can select not to provide location for targeted content delivery services. In yet another example, users can select to limit the length of time location data is maintained or entirely prohibit the development of a profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   a head-mounted display; and
   a processing apparatus configured to:
      render, for presentation on the head-mounted display, a computer-generated reality environment in a first state using an application that includes multiple processes associated with respective objects of the computer-generated reality environment, wherein each of the multiple processes includes one or more threads and is associated with a respective object separately from other parts of the computer-generated reality environment, and wherein the application includes a broadcast process and two or more of the multiple processes associated with respective objects of the computer-generated reality environment include listening threads;
      register the listening threads with the broadcast process;
      generate a message that indicates a change in the computer-generated reality environment;
      send, using the broadcast process, the message to the listening threads of the two or more of the multiple processes associated with respective objects of the computer-generated reality environment;
      responsive to the message, update configurations of objects of the computer-generated reality environment to change the computer-generated reality environment from the first state to a second state; and
      render, for presentation on the head-mounted display, the computer-generated reality environment in the second state using the application.

2. The system of claim 1, wherein the application includes a broadcast process that sends the message, and the processing apparatus is configured to:
   use the broadcast process to send the message to all processes of the application that are associated with respective objects of the computer-generated reality environment.

3. The system of claim 1, wherein the application includes a simulation process that coordinates objects of the computer-generated reality environment and renders views of the computer-generated reality environment, and the message is sent by the simulation process.

4. The system of claim 1, wherein the message includes an indication of a transition period and the processing apparatus is configured to:

responsive to the message, update the configurations of objects of the computer-generated reality environment in a sequence of intermediate steps to gradually transition the computer-generated reality environment from the first state to the second state via a sequence of intermediate states over the transition period; and render, for presentation on the head-mounted display, the computer-generated reality environment in the sequence of intermediate states using the application.

5. The system of claim 1, wherein the message includes a configuration category and corresponding configuration value.

6. The system of claim 1, wherein the message includes an indication of weather for the computer-generated reality environment.

7. The system of claim 1, wherein the message includes an indication of time of day for the computer-generated reality environment.

8. The system of claim 1, wherein the message includes an indication of a room type for the computer-generated reality environment.

9. The system of claim 1, wherein the message is sent using event-based signaling.

10. The system of claim 1, wherein the message is sent via an inter-process message queue.

11. The system of claim 1, wherein the message is generated based on user input received via a user interface.

12. The system of claim 1, wherein the application is a computer-generated reality application.

13. A method comprising:
rendering a computer-generated reality environment in a first state using an application that includes multiple processes associated with respective objects of the computer-generated reality environment, wherein each of the multiple processes includes one or more threads and is associated with a respective object separately from other parts of the computer-generated reality environment, and wherein the application includes a broadcast process and two or more of the multiple processes associated with respective objects of the computer-generated reality environment include listening threads;

registering the listening threads with the broadcast process;

generating a message that indicates a change in the computer-generated reality environment;

sending, using the broadcast process, the message to the listening threads of the two or more of the multiple processes associated with respective objects of the computer-generated reality environment;

responsive to the message, updating configurations of objects of the computer-generated reality environment to change the computer-generated reality environment from the first state to a second state; and rendering the computer-generated reality environment in the second state using the application.

14. The method of claim 13, wherein the application includes a broadcast process that sends the message, and comprising:
using the broadcast process, sending the message to all processes of the application that are associated with respective objects of the computer-generated reality environment.

15. The method of claim 13, wherein the application includes a simulation process that coordinates objects of the computer-generated reality environment and renders views of the computer-generated reality environment, and the message is sent by the simulation process.

16. The method of claim 13, wherein the message includes an indication of a transition period, and comprising:
responsive to the message, updating the configurations of objects of the computer-generated reality environment in a sequence of intermediate steps to gradually transition the computer-generated reality environment from the first state to the second state via a sequence of intermediate states over the transition period; and rendering the computer-generated reality environment in the sequence of intermediate states using the application.

17. A non-transitory computer-readable storage medium comprising executable instructions that, when executed by a processor, facilitate performance of operations comprising:
rendering a computer-generated reality environment in a first state using an application that includes multiple processes associated with respective objects of the computer-generated reality environment, wherein each of the multiple processes includes one or more threads and is associated with a respective object separately from other parts of the computer-generated reality environment, and wherein the application includes a broadcast process and two or more of the multiple processes associated with respective objects of the computer-generated reality environment include listening threads;

registering the listening threads with the broadcast process;

generating a message that indicates a change in the computer-generated reality environment;

sending, using the broadcast process, the message to the listening threads of the two or more of the multiple processes associated with respective objects of the computer-generated reality environment;

responsive to the message, updating configurations of objects of the computer-generated reality environment to change the computer-generated reality environment from the first state to a second state; and rendering the computer-generated reality environment in the second state using the application.

18. The non-transitory computer-readable storage medium of claim 17, comprising executable instructions that, when executed by a processor, facilitate performance of operations comprising:
using the broadcast process, sending the message to all processes of the application that are associated with respective objects of the computer-generated reality environment.

19. The non-transitory computer-readable storage medium of claim 17, wherein the broadcast process is a simulation process that coordinates objects of the computer-generated reality environment and renders views of the computer-generated reality environment.

20. The non-transitory computer-readable storage medium of claim 17, wherein the message includes an indication of a transition period, and comprising executable instructions that, when executed by a processor, facilitate performance of operations comprising:
responsive to the message, updating the configurations of objects of the computer-generated reality environment in a sequence of intermediate steps to gradually transition the computer-generated reality environment from the first state to the second state via a sequence of intermediate states over the transition period; and rendering the computer-generated reality environment in the sequence of intermediate states using the application.

\* \* \* \* \*